US012214235B2

(12) United States Patent
Shively et al.

(10) Patent No.: US 12,214,235 B2
(45) Date of Patent: *Feb. 4, 2025

(54) SURROGATE FOAM TEST SYSTEM

(71) Applicant: Oshkosh Corporation, Oshkosh, WI (US)

(72) Inventors: Jason Shively, Oshkosh, WI (US); Tim Nelson, Oshkosh, WI (US); David Kay, Appleton, WI (US); Seth Newlin, Appleton, WI (US)

(73) Assignee: Oshkosh Corporation, Oshkosh, WI (US)

( * ) Notice: Subject to any disclaimer, the term of this patent is extended or adjusted under 35 U.S.C. 154(b) by 279 days.

This patent is subject to a terminal disclaimer.

(21) Appl. No.: 17/950,579

(22) Filed: Sep. 22, 2022

(65) Prior Publication Data

US 2023/0024953 A1 Jan. 26, 2023

Related U.S. Application Data

(63) Continuation of application No. 16/944,470, filed on Jul. 31, 2020, now Pat. No. 11,478,671, which is a (Continued)

(51) Int. Cl.
*A62C 37/50* (2006.01)
*A62C 5/00* (2006.01)
(Continued)

(52) U.S. Cl.
CPC .............. *A62C 37/50* (2013.01); *A62C 5/002* (2013.01); *A62C 5/02* (2013.01); *A62C 27/00* (2013.01); *A62C 37/04* (2013.01)

(58) Field of Classification Search
CPC ........... A62C 37/50; A62C 5/002; A62C 5/02; A62C 27/00; A62C 37/04; A62C 5/027; A62C 5/00; A62C 99/0036
See application file for complete search history.

(56) References Cited

U.S. PATENT DOCUMENTS 8,479,593 B1 * 7/2013 Kudo .................... A62C 37/50 73/865.9
9,008,913 B1 4/2015 Sears et al.
(Continued)

FOREIGN PATENT DOCUMENTS

WO WO-2016/048136 A1 3/2016

OTHER PUBLICATIONS

International Search Report and Written Opinion regarding PCT/US2018/017212, mail date Apr. 20, 2018, 16 pps.
(Continued)

*Primary Examiner* — Eric S. McCall
*Assistant Examiner* — Timothy P Graves
(74) *Attorney, Agent, or Firm* — Foley & Lardner LLP

(57) ABSTRACT

A fluid distribution system includes a first flow meter configured to be positioned along an agent line, a metering valve configured to be positioned downstream of the first flow meter, a second flow meter configured to be positioned downstream of the first flow meter and an eductor, and a controller configured to selectively operate the fluid distribution system in a testing mode where the controller is configured to acquire a first flow rate of a fluid flowing through the first flow meter and a second flow rate of the fluid flowing through the second flow meter, determine a performance characteristic based on the first flow rate and the second flow rate, and modulate a current setting of the metering valve from a first setting to a second setting and conduct the testing mode sequence again at the second setting to verify the fluid distribution system is performing properly.

19 Claims, 8 Drawing Sheets

Related U.S. Application Data continuation of application No. 15/890,477, filed on Feb. 7, 2018, now Pat. No. 10,758,759.

(60) Provisional application No. 62/456,459, filed on Feb. 8, 2017.

(51) Int. Cl.

| | |
|---|---|
| ***A62C 5/02*** | (2006.01) |
| ***A62C 27/00*** | (2006.01) |
| ***A62C 37/36*** | (2006.01) |

(56) References Cited

U.S. PATENT DOCUMENTS

| | | | | |
|---|---|---|---|---|
| 9,315,210 | B2 | 4/2016 | Sears et al. | |
| 9,493,921 | B2 | 11/2016 | Amin et al. | |
| 2006/0151184 | A1 | 7/2006 | Boyle | |
| 2013/0105182 | A1* | 5/2013 | McLoughlin ............ | G05D 9/12 137/101.25 |
| 2014/0026355 | A1 | 1/2014 | Cortes Ruiz | |
| 2014/0238703 | A1 | 8/2014 | Stephens et al. | |
| 2014/0262355 | A1* | 9/2014 | Linsmeier ................ | A62C 5/02 137/551 |
| 2017/0050063 | A1 | 2/2017 | Shively et al. | |
| 2017/0051462 | A1 | 2/2017 | Amin et al. | |
| 2018/0221697 | A1 | 8/2018 | Shively et al. | |

OTHER PUBLICATIONS

NFPA 11, Standard for Low-, Medium- and High-Expansion Foam, 2010 Ed.

* cited by examiner

SURROGATE FOAM TEST SYSTEM

CROSS-REFERENCE TO RELATED PATENT APPLICATIONS

This application is a continuation of U.S. patent application Ser. No. 16/944,470, filed Jul. 31, 2020, which is a continuation of U.S. patent application Ser. No. 15/890,477, filed Feb. 7, 2018, which claims the benefit of and priority to U.S. Provisional Patent Application No. 62/456,459, filed Feb. 8, 2017, all of which are incorporated herein by reference in their entireties.

BACKGROUND

Fire fighting vehicles such as Aircraft Rescue Fire Fighting ("ARFF") vehicles are specially designed to respond to airport ground emergencies (e.g., involving an aircraft). Airport ground emergencies may occur anywhere on or near airport property. Water and other agents (e.g., foam fire suppressants) is transported to the emergency site to be applied and facilitate extinguishment.

SUMMARY

One embodiment relates to a fluid distribution system for a fire apparatus that is selectively operable in a testing mode and an operating mode. The fluid distribution system includes a first flow meter configured to be positioned along an agent line, a metering valve configured to be positioned downstream of the first flow meter, a second flow meter configured to be positioned downstream of the first flow meter and an eductor, and a controller configured to selectively operate the fluid distribution system in the testing mode. During the testing mode, the controller is configured to acquire a first flow rate of a fluid flowing through the first flow meter and a second flow rate of the fluid flowing through the second flow meter, determine a performance characteristic based on the first flow rate and the second flow rate, and modulate a current setting of the metering valve from a first setting to a second setting and conduct the testing mode sequence again at the second setting of the metering valve to verify the fluid distribution system is performing properly.

Another embodiment relates to an apparatus for a fluid distribution system of a fire apparatus that includes a water line configured to receive water from a water source, an agent line configured to receive agent from an agent source, a flush line configured to receive the water from the water source and connecting to the agent line at a junction, a flush valve positioned to selectively prevent the water from flowing along the flush line downstream of the flush valve, an agent valve positioned to selectively prevent the agent from flowing along the agent line downstream of the agent valve, a first flow meter positioned along the agent line downstream of the junction, a second flow meter positioned downstream of the first flow meter, an eductor coupled to the agent line and the water line downstream of the first flow meter and upstream of the second flow meter, and a metering valve positioned downstream of the first flow meter and upstream of the eductor. The apparatus includes a controller configured to selectively operate the fluid distribution system in a testing mode. During the testing mode, the controller is configured to close the agent valve, open the flush valve, perform a testing sequence that includes (a) acquiring a first flow rate of the water flowing through the first flow meter, (b) acquiring a second flow rate of the water flowing through the second flow meter, and (c) determining a performance characteristic based on the first flow rate and the second flow rate, modulate a current setting of the metering valve from a first setting to a second setting, and conduct the testing sequence again at the second setting of the metering valve to verify the fluid distribution system is performing properly.

Still another embodiment relates to a fluid distribution system for a fire apparatus. The fluid distribution system includes a water line configured to receive water from a water source, an agent line configured to receive agent from an agent source, a flush line configured to receive the water from the water source where the flush line connects to the agent line at a junction and the flush line is separate from the water line, a flush valve positioned along the flush line and upstream of the junction to selectively prevent the water from flowing into the agent line, an agent valve positioned along the agent line and upstream of the junction to selectively prevent the agent from flowing along the agent line downstream of the agent valve, a first flow meter positioned along the agent line downstream of the junction, a second flow meter positioned downstream of the first flow meter, an eductor coupled to the agent line and the water line downstream of the first flow meter and upstream of the second flow meter, and a metering valve positioned downstream of the first flow meter and upstream of the eductor.

The invention is capable of other embodiments and of being carried out in various ways. Alternative exemplary embodiments relate to other features and combinations of features as may be generally recited in the claims.

BRIEF DESCRIPTION OF THE DRAWINGS

The invention will become more fully understood from the following detailed description taken in conjunction with the accompanying drawings wherein like reference numerals refer to like elements, in which.

DETAILED DESCRIPTION

Figure 1:
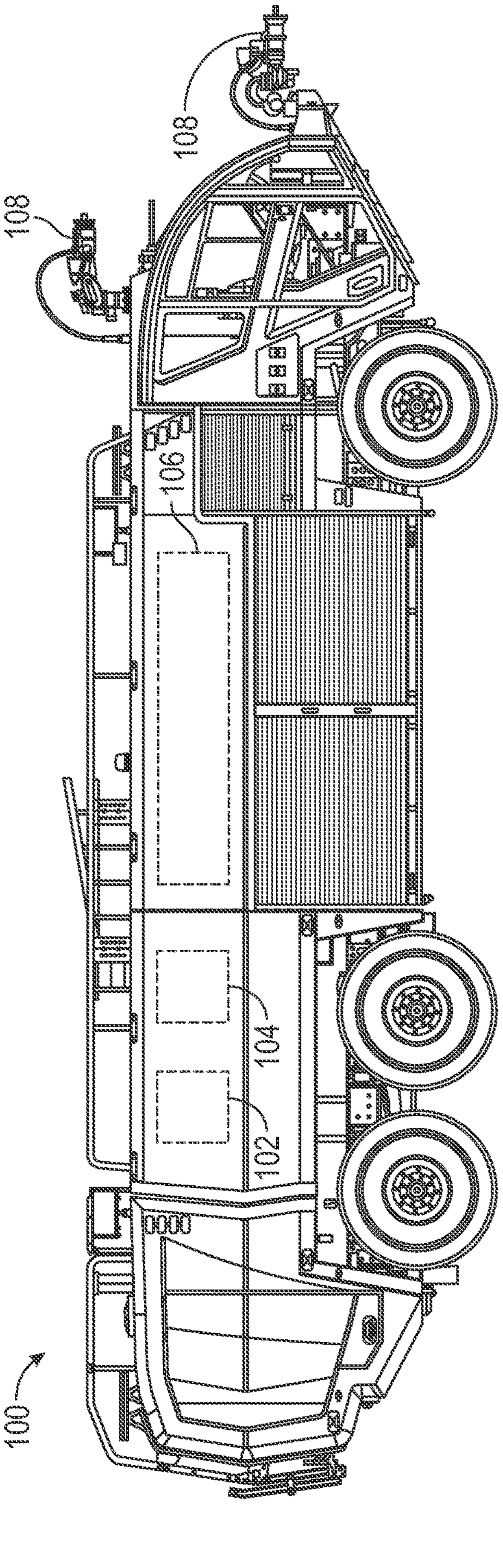
FIG. 1 is a schematic diagram of a fire fighting vehicle having a surrogate foam test system, according to an exemplary embodiment.

Before turning to the figures, which illustrate the exemplary embodiments in detail, it should be understood that the application is not limited to the details or methodology set forth in the description or illustrated in the figures. It should also be understood that the terminology is for the purpose of description only and should not be regarded as limiting.

Fire fighting vehicles, for example aircraft rescue fire fighting (ARFF) vehicles, are specialized vehicles that carry water and foam with them to the scene of an emergency. Most commonly, ARFF vehicles are commissioned for use at an airfield, where the location of an emergency (e.g., an airplane crash) can widely vary, which creates the need of transporting firefighting materials and personnel to the emergency site. ARFF vehicles are heavy duty vehicles in nature, and are able to respond at high speeds to reach all parts of an airfield quickly. The systems outlined herein may be deployed as part of any type of fire apparatus.

ARFF vehicles typically combat fires (e.g., jet fuel fires, etc.) with foam distribution systems. These foam distribution systems make use of foam fire suppressants, often aqueous film forming foam (AFFF), although other foam types (e.g., low-expansion foams, medium-expansion foams, high-expansion foams, alcohol-resistant foams, synthetic foams, protein-based foams, and foams to be developed, etc.) may be utilized. The systems outlined herein may be used with any type of foam. AFFF is water-based and frequently includes hydrocarbon-based surfactant (e.g., sodium alkyl sulfate, etc.) and a fluorosurfactant (e.g., fluorotelomers, perfluorooctanoic acid, perfluorooctanesulfonic acid, etc.). AFFF has a low viscosity and spreads rapidly across the surface of hydrocarbon fuel fires. An aqueous film forms beneath the foam on the fuel surface, cools burning fuel, and prevents evaporation of flammable vapors and reignition of fuel once it has been extinguished. The film also has a self-healing capability whereby holes in the film layer are rapidly resealed. In use, an AFFF (or other foam) concentrate is stored in a foam tank, and a foam concentrate-to-water ratio is established. The concentrate is mixed with water from a water tank according to the established ratio, thereby forming a foam mixture to be dispensed. The mixed foam is then ejected from the ARFF vehicle and applied to a fire.

Because of the low-frequency of airplane accidents (or other accidents requiring the use of an ARFF vehicle), fire fighting foam systems must be tested often to ensure that the systems can be fully utilized when an accident occurs. In extreme cases, an ARFF vehicle's foam system may not be used for years. During testing, fire fighting foam systems traditionally produce large amounts of AFFF waste, which must be properly disposed of by a containment facility and/or dispensed on the ground. Testing fire fighting foams systems in this manner can be very costly, and often requires the use of additional external testing tanks holding various testing fluids. However, water from the ARFF vehicle's water tank may be used (e.g., as a surrogate fluid in place of foam, etc.) during testing by routing the water through the flush line of the ARFF using the systems described herein, to provide an environmentally cleaner and less expensive test system and process. In one embodiment, a first flow meter is positioned to monitor a first flow rate of fluid in a flush and/or foam line upstream of a proportioning device, and a second flow meter is positioned to monitor a flow rate of a mixed solution fluid, downstream of the proportioning device. By comparing the two flow rates, the foam system can be confirmed to be operational for a target rated output actually dispensing foam and without the use of auxiliary collection tanks. Through the use of the second flow rate, the comparison is more accurate than conventional comparison methods which may utilize an assumed flow rate for the mixed solution instead. The assumed flow rate can be much different than the second flow rate, which is what is actually provided to the foam system. Accordingly, exemplary embodiments of the present disclosure utilize a more accurate comparison thereby increasing the desirability of the foam system compared to conventional foam testing systems.

Referring to FIG. 1, an ARFF vehicle 100 is shown according to an exemplary embodiment. ARFF vehicle 100 includes a first tank (e.g., vessel, container, chamber, volume, etc.), shown as water tank 102; a second tank (e.g., vessel, container, chamber, volume, etc.), shown as foam tank 104 (e.g., agent tank, etc.); a system (e.g., assembly, machine, etc.), shown as surrogate foam test system 106; and nozzles (e.g., turrets, sprayers, ejectors, etc.), shown as projection turrets 108. Water tank 102 and foam tank 104 are generally corrosion and UV resistant polypropylene tanks, although other tank types may be used. Water tank 102 stores water or other liquid for mixing with agent or foam as described herein, or for dispensing or testing without mixing with foam. In one embodiment, water tank 102 is a 3,000 gallon capacity tank, and foam tank 104 is a 420 gallon capacity tank. In another embodiment, water tank 102 is a 1,500 gallon capacity tank, and foam tank 104 is a 210 gallon capacity tank. In another embodiment, water tank 102 is a 4,500 gallon capacity tank, and foam tank 104 is a 630 gallon capacity tank. In another embodiment, ARFF vehicle 100 includes multiple water tanks 102 and/or multiple foam tanks 104. In another embodiment, the tank sizes and requirements are specified by the customer. It should be understood that water and foam tank configurations are highly customizable, and the scope of the present application is not limited to particular size, combination, or configuration of water tank 102 and foam tank 104.

According to the systems described herein, water from water tank 102 may be used as a surrogate fluid and routed through surrogate foam test system 106. Surrogate foam test system 106 may be, include, or form part of the foam system used by ARFF vehicle 100 to dispense foam and/or fight fires. Foam tank 104 stores an agent such as a foam fire suppressant (e.g., AFFF, etc.) and is connected to the agent or foam distribution system of ARFF vehicle 100. In an exemplary embodiment, surrogate foam test system 106 is part of the foam distribution system of ARFF vehicle 100. The foam distribution system includes various projection turrets 108 for dispensing fire fighting foam and water, depending on the configurations of the system. Although depicted as located at the front of ARFF vehicle 100, projection turrets 108 may be located in various locations throughout ARFF vehicle 100. For example, ARFF vehicle 100 may have a roof turret, a bumper turret, hose projection connections, swing out hose reels, etc. In an exemplary embodiment, projection turret 108 is a roof turret that projects fluid at between 375 and 750 gallons per minute. Projection turrets 108 may include non-aspirating or aspirating turrets, and may be controllable with an electric joystick control system. In another exemplary embodiment, projection turret 108 is a bumper turret that projects fluid at between 625 and 1,250 gallons per minute. In another embodiment, projection turrets 108 are capable of flow rates up to 1,585 gallons per minute. It should be understood that water tank 102, foam tank 104, surrogate foam test system 106, and projection turrets 108 are connected by appropriate piping as defined by the specifications of a particular ARFF vehicle 100 model.

Figure 2:
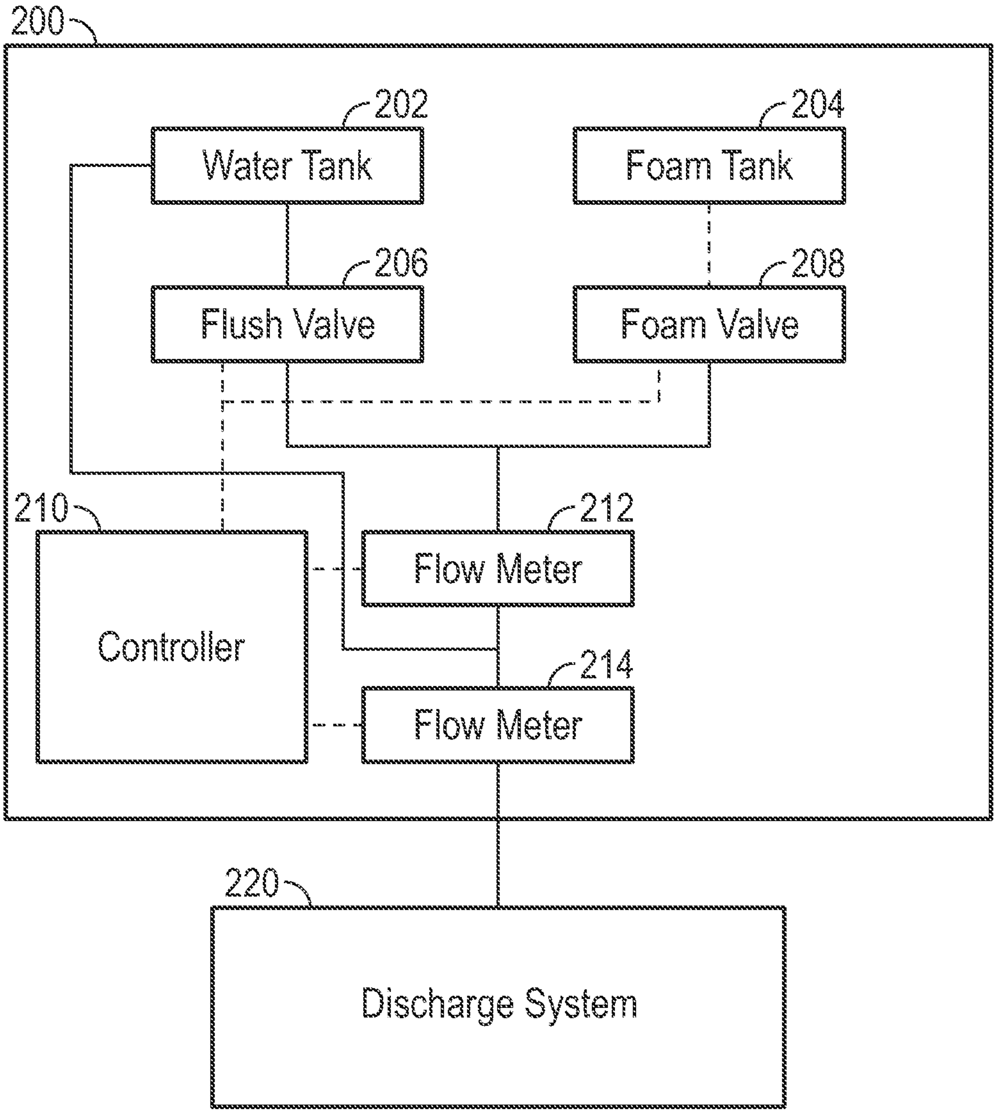
FIG. 2 is a block diagram of a surrogate foam test system for a fire fighting vehicle, according to an exemplary embodiment.

Referring to FIG. 2, a block diagram of a system (e.g., assembly, machine, etc.), shown as surrogate foam test system 200, for a fire fighting vehicle is shown, according to an exemplary embodiment. Surrogate foam test system 200 includes a first tank (e.g., vessel, container, chamber, volume, etc.), shown as water tank 202; a second tank (e.g., vessel, container, chamber, volume, etc.), shown as foam tank 204; a first valve (e.g., ball valve, electromagnetic valve, electronically controllable valve, etc.), shown as flush valve 206; a second valve (e.g., ball valve, electromagnetic valve, electronically controllable valve, a metering valve, a shut off valve, etc.), shown as foam valve 208; a controller 210; a first flow meter, shown as flow meter 212; a second flow meter, shown as flow meter 214; and a system (e.g., assembly, machine, etc.), shown as discharge system 220. Flow meter 212 and flow meter 214 may be disposed upstream and downstream, respectively, of an eductor. Flow meter 212 may provide signals to controller 210 relating to a foam flow (e.g., during a operational configuration, etc.) and/or a surrogate foam flow (e.g., during a test configuration, etc.), and flow meter 214 may provide signals to controller 210 relating to a solution (e.g., mixture of water and foam and/or surrogate foam, etc.) flow. Controller 210 may be configured to test the foam system of an ARFF vehicle by dividing the measured value of flow from flow meter 212 by the measured value of flow from flow meter 214 to calculate a foam percentage. Controller 210 may provide and/or indicate the foam percentage. A foam percentage within a predefined threshold may define a passing result of the foam system test. Although depicted as separate in FIG. 2, in an exemplary embodiment, surrogate foam test system 200 may be integrated into discharge system 220.

In an exemplary embodiment, water tank 202 is the main water tank of the fire fighting vehicle and may be a water tank as described above. Foam tank 204 is for storing and dispensing a foam fire suppressant. Flush valve 206 controls the flow of water from water tank 202 to the foam system through a flush line. In an exemplary embodiment, flush valve 206 is a ball valve. Foam valve 208 controls the flow of foam fire suppressant from foam tank 204. In an exemplary embodiment, flush valve 206 and foam valve 208 are two-way ball valves, and are controllable by controller 210. As an example, flush valve 206 and foam valve 208 may have a single body, a three piece body, a split body, a top entry, a welded body, etc. Flush valve 206 and foam valve 208 may also include a full port valve, a reduced port valve, a V-port ball valve, a compact ball valve, a trunnion ball valve, a floating ball valve, a cavity filler ball valve, etc.

Flow meter 212 and/or flow meter 214 include all components necessary for measuring and quantifying the movement of fluid therethrough. Flow meter 212 and/or flow meter 214 may be any device capable of measuring the flow of fluid. For example, flow meter 212 and/or flow meter 214 may include a mechanical flow meter, an electronic flow meter, a rotary piston, a gear flow meter, a vortex flow meter, a turbine flow meter, a Venturi meter, an orifice plate, etc. After flowing through surrogate foam test system 200, water from water tank 202 enters the remainder of discharge system 220 of the fire fighting vehicle. In an exemplary embodiment, discharge system 220 is the AFFF foam distribution system as described herein.

Figure 3A:
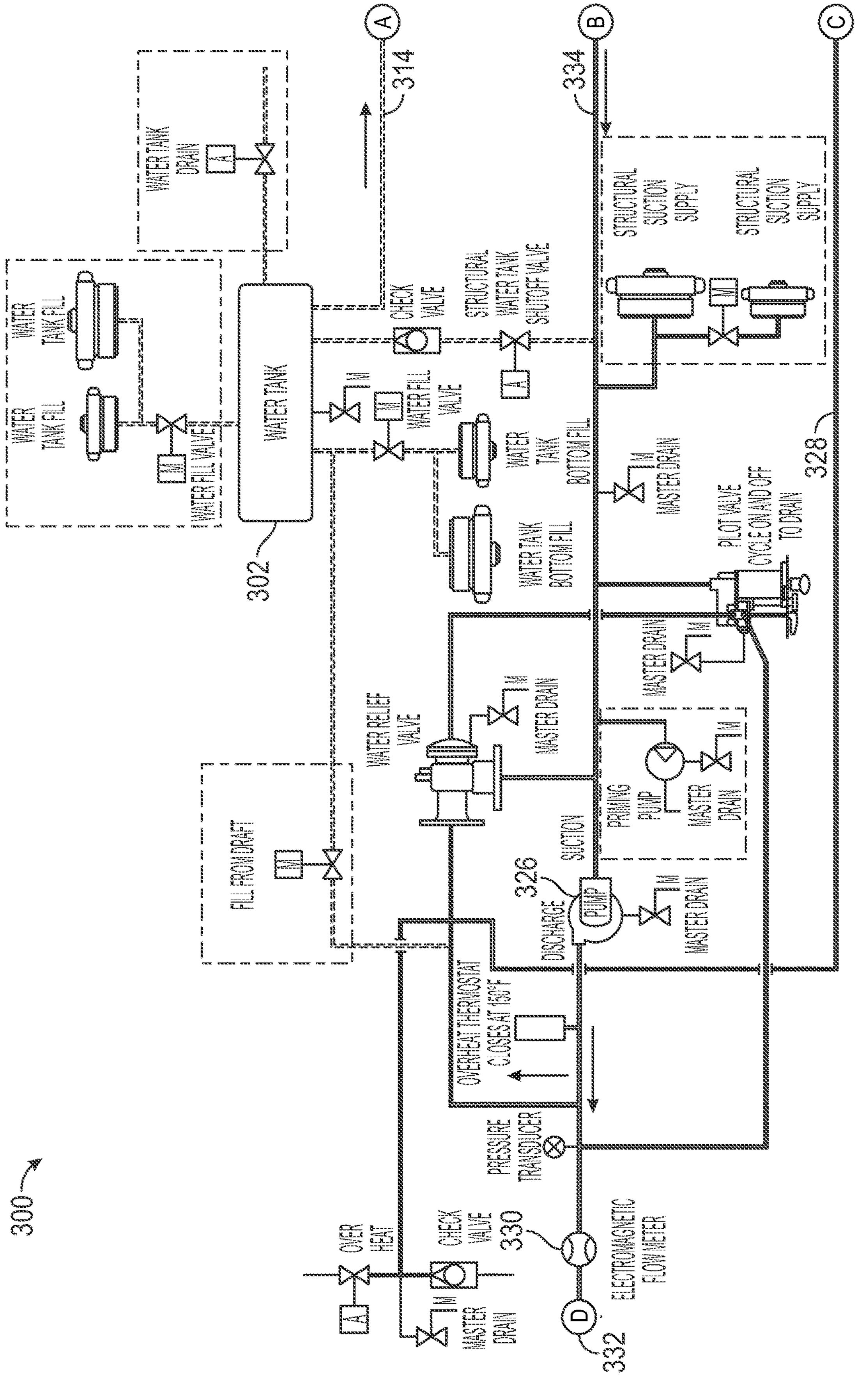
FIGS. 3A and 3B are a schematic piping diagram of a surrogate foam test system for a fire fighting vehicle, according to an exemplary embodiment.
Figure 3B:
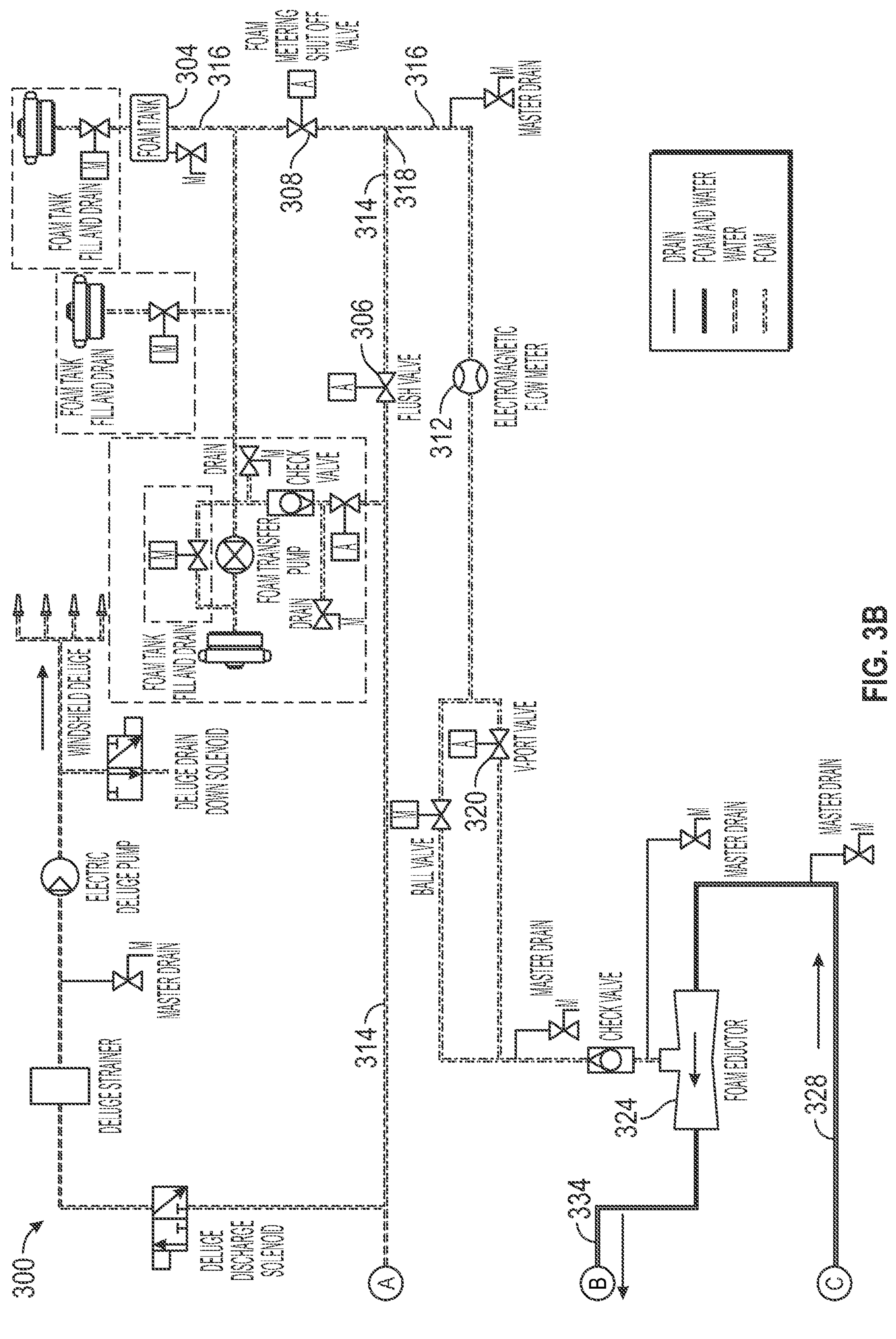

Referring to FIGS. 3A and 3B, a schematic piping diagram of a system (e.g., assembly, machine, etc.), shown as surrogate foam test system 300, is shown according to an exemplary embodiment. The piping diagram of surrogate foam test system 300 includes various dimensions and notations throughout, which are provided as examples and are not meant to be limiting. Surrogate foam test system 300 is generally used to test the operability, effectiveness, and efficiency of a foam distribution system for a fire fighting vehicle (e.g., an ARFF vehicle as discussed above, etc.). Surrogate foam test system 300 is integrated into a system (e.g., assembly, machine, etc.) of the fire fighting vehicle, shown as foam distribution system 332, and includes a first tank (e.g., vessel, container, chamber, volume, etc.), shown as water tank 302; a second tank (e.g., vessel, container, chamber, volume, etc.), shown as foam tank 304; a first valve (e.g., ball valve, electromagnetic valve, electronically controllable valve, etc.), shown as flush valve 306; a second valve (e.g., ball valve, electromagnetic valve, electronically controllable valve, etc.), shown as foam metering shut off valve 308; and a flow meter (e.g., flow sensor, etc.), shown as electromagnetic flow meter 312.

A line (e.g., conduit, pipe, connector, etc.), shown as flush line 314, connects to water tank 302 and extends through flush valve 306. Flush line 314 continues into another line (e.g., conduit, pipe, connector, etc.), shown as foam line 316, at a junction (e.g., connector, interface, fitting, T-fitting, etc.), shown as junction 318. In an exemplary embodiment, junction 318 is a T-junction. Foam line 316 connects to foam tank 304, connects to junction 318, and extends through foam metering shut off valve 308. In an exemplary embodiment, foam metering shut off valve 308 is located upstream of junction 318. Electromagnetic flow meter 312 is integrated within foam line 316, downstream of junction 318.

Additional elements of surrogate foam test system 200 and/or foam distribution system 332 of the vehicle include a metering valve (e.g., ball valve, electromagnetic valve, electronically controllable valve, V-port valve, etc.), shown as V-port valve 320; an eductor (e.g., jet pump, ejector, Venturi pump, etc.), shown as foam eductor 324; a pump (e.g., centrifugal pump, positive displacement pump, rotary pump, hydraulic pump, single stage, multi-stage, etc.), shown as pump 326; a line (e.g., conduit, pipe, connector, etc.), shown as water line 328; and a meter (e.g., sensor, flow meter, etc.), shown as electromagnetic flow meter 330. Foam distribution system 332 may also connect to various outlets (e.g., nozzles, turrets, hoses, etc.) of the fire fighting vehicle, and may contain additional components (e.g., pressure relief valves, safety valves, check valves, pilot valves, temperature sensors, fill and drain ports, lines, pumps, etc.).

Electromagnetic flow meter 312 measures a flow rate from foam line 316 into V-port valve 320. V-port valve 320 controls a flow into foam eductor 324. Flow from foam eductor 324 enters pump 326 and is transmitted to electromagnetic flow meter 330. Electromagnetic flow meter 330 measures a flow rate into foam distribution system 332.

In an exemplary embodiment, water tank 302 is coupled to an ARFF vehicle, and stores water as the main water tank of the vehicle. Water tank 302 provides water for mixing with a foam fire suppressant concentrate to create a foam mixture (i.e., a mixture of water and foam concentrate) prior to dispensing. Water tank 302 also provides water as a surrogate fluid to surrogate foam test system 300 during a testing configuration. Water tank 302 has an outlet that is coupled to flush line 314. In this embodiment, foam tank 304 is also coupled to the ARFF vehicle and stores foam concentrate. Foam tank 304 has an outlet that is coupled to foam line 316, which is used to provide foam to the ARFF vehicle's foam distribution system 332 during an operational configuration.

Testing Configuration of Surrogate Foam Test System

Surrogate foam test system 300 may be set to a testing configuration/mode for testing the operability, efficiency, and effectiveness of foam distribution system 332. During the testing configuration of surrogate foam test system 300, flush valve 306 is in an open position, allowing the flow of water from water tank 302. Foam metering shut off valve 308 is in a closed position, blocking the flow of foam concentrate from foam tank 304. The testing configuration and valve configurations may be remotely activated by a controlling device (e.g., a controller articulated by an operator, a controller within a cab of the ARFF vehicle, etc.). In some examples, the valves are activated by a servo or solenoid device. The controlling device may be a control computing system of the ARFF vehicle and/or controller 210, which allows an operator to switch between various configurations of surrogate foam test system 300 and foam distribution system 332. The controlling device may include graphical displays, human interface and input devices, communication devices, mechanical display devices, etc. Water flows from water tank 302 into flush line 314, through open flush valve 306, and into junction 318. Closed foam metering shut off valve 308 blocks the flow of water and foam concentrate, and thus the water flows through foam line 316 downstream of junction 318.

The water continues to flow into electromagnetic flow meter 312. As the water passes through electromagnetic flow meter 312, a flow rate of the water, $F_1$, is measured. From electromagnetic flow meter 312, the water flows to V-port valve 320. V-port valve 320 may include any fluid proportioning device that generally controls and regulates the flow rate of fluid therethrough. V-port valve 320 controls a flow rate of fluid, $F_2$, through V-port valve 320. In an operational mode, the fluid flowing through V-port valve 320 is foam concentrate from foam tank 304. By controlling the flow rate of the foam in V-port valve 320, V-port valve 320 may establish a foam concentrate-to-water ratio when the foam concentrate reaches foam eductor 324 after exiting V-port valve 320. For example, a faster flow rate of foam will result in a higher percentage of foam to water, and a slower flow rate will result in a lower percentage of foam to water. In some embodiments, V-port valve 320 is closed such that $F_2$ equals zero.

V-port valve 320 may make use of various means to independently or cooperatively control the fluid. In an exemplary embodiment, V-port valve 320 includes a rotatable ball member having a V-shaped or slotted port opening. In this embodiment, rotation of the ball member causes a selectively larger orifice for flow to pass through. Accordingly, the flow rate of fluid through V-port valve 320 is related to the rotational position of the rotatable ball member and the size of the opening at that rotational position. Use of such a rotatable ball member is advantageous compared to rotation of a traditional ball member having a standard port. The V-shaped opening facilitates rapid response times, minimal leakage, increased range of fluid flow control, increased repeatability, increased flow capacity, and ease of use with foam containing fluids.

In an alternative embodiment, V-port valve 320 includes an orifice plate. Such an orifice plate is generally a plate with an opening through it, placed within the stream of flow in order to constrict/regulate the flow to a certain flow rate. The flow rate is dependent on the dimensions of the orifice plate in use. V-port valve 320 may include an orifice plate for each discharge option on the vehicle. The orifice plates can be changed to achieve different foam percentages, and the selection of an orifice plate may be controlled by air cylinders. Each cylinder is synchronized with an air system of the ARFF vehicle. When a turret, preconnect, or other discharge valve is opened, the correct air cylinder opens and allows the proper percentage of foam to flow. However, in the testing configuration, because foam metering shut off valve 308 is closed and flush valve 306 is open, the fluid flowing through V-port valve 320 is the water from water tank 302.

After the water has passed through foam eductor 324 and into pump 326, the water is provided to electromagnetic flow meter 330 where a flow rate, $F_4$, of the water is measured prior to the water entering foam distribution system 332. By comparing the flow rate of the water through electromagnetic flow meter 312, $F_1$, with the flow rate of the water through electromagnetic flow meter 330, $F_4$, an operator (or the control system) can confirm that foam distribution system 332 is properly functioning.

While not shown, it is understood that this comparison can be performed by a processor, processing circuit, microprocessor, computer, central processing unit, controller, or other system associated with surrogate foam test system 300. For example, this comparison can be performed by an on-board controller of the ARFF vehicle. Similarly, this comparison can be performed by a nearby mobile device (e.g., personal electronic device, smartphone, laptop, tablet, heads up display, etc.) such that this comparison may be displayed to an operator on the mobile device.

According to an exemplary embodiment, a foam percentage, $F_5$, is calculated by dividing $F_1$ by $F_4$. This foam percentage, $F_5$, may be calculated for a variety of different rated output values. During testing, the foam percentage, $F_5$, is compared to a target foam percentage, $F_6$, for each of the different rated output values. The target foam percentage, $F_6$, may be, for example, one percent, three percent, six percent, eight percent, or other similar values such that surrogate foam test system 300 is tailored for a target application.

For a target rated output, i, the difference between the foam percentage, $F_{5i}$, and the target foam percentage, $F_{6i}$, is indicative of a performance characteristic (e.g., efficiency, etc.), $P_i$, of foam distribution system 332 for the target rated output, i. Foam distribution system 332 may be comprehensively tested for each of the variety of different rated output values such that performance characteristics for each of the variety of different rated output values are obtained. Each of the variety of different rated output levels corresponds with a target flow rate (e.g., 100 gallons per minute (GPM), 1000 GPM, etc.) for an output (e.g., nozzle, turret, panel, connector, discharge, etc.) of foam distribution system 332. In some applications, each of the target foam percentages corresponds with a different rated output value as prescribed by a standard or code (e.g., for 100 GPM the target foam percentage is three percent, etc.). The performance characteristics may analyzed to determine if any of the target rated outputs are operating undesirably. For example, relatively low performance characteristics may indicate that service of the target rated output is needed.

Rather than comparing flow rate of a fluid from a tank against a flow rate of the fluid into a foam distribution system, conventional foam testing systems generate a foam percentage by simply comparing against the rated output values. Essentially, the conventional foam testing systems assume that the flow rate of fluid into the foam distribution system is equal to the rated output values. In fact, in many applications, there is a substantial difference between a rated output value and a flow rate into the foam distribution system. In some applications, the flow rate into the foam distribution system can be as much as ten percent greater than the rated output value. For example, a conventional foam testing system may generate a flow rate of 110 GPM into the foam distribution system for a rated output value of 100 GPM, such as for a hand line. In another example, a conventional foam testing system may generate a flow rate of 1100 GPM into the foam distribution system for a rated output value of 1000 GPM. These differences in generated flow rates and rated output values cause corresponding differences in foam percentages that conventional foam testing systems either ignore or are unable to deal with. As a result, conventional foam testing systems are unable to consistently generate accurate foam percentages. This may result in failed tests, increased expense, and undesirability of the conventional foam distribution system and therefore undesirability of the conventional foam testing system.

The locations of electromagnetic flow meter 312 and electromagnetic flow meter 330 within surrogate foam test system 300 is advantageous because the flow rate, $F_5$, of fluid into overall foam distribution system 332, rather than the rated output value, is used to generate the foam percentage. As a result, foam percentages generated by surrogate foam test system 300 are more accurate than those formed by conventional foam testing systems. Because foam percentages generated by surrogate foam test system 300 are more accurate than those formed by conventional foam testing systems, performance characteristics for each of the variety of different rated outputs in overall foam distribution system 332 are more accurate.

In some embodiments, surrogate foam test system 300 utilizes the performance characteristics (e.g., efficiency, etc.) of a target rated output (e.g., hand line, nozzle, etc.) to selectively control V-port valve 320 for the target rated output. For example, surrogate foam test system 300 may store (e.g., in a memory) a performance characteristic associated with the target rated output obtained during a testing mode, and may selectively control V-port valve 320 based on the stored performance characteristic. In one example, surrogate foam test system 300 may be aware that a nozzle is operating at ninety-seven percent of optimal efficiency. Accordingly, surrogate foam test system 300 realizes that the nozzle cannot produce the rated output and will instead provide, using V-port valve 320, a flow rate to the nozzle that is ninety-seven percent of a flow rate corresponding to the rated output. Further, in some implementations, surrogate foam test system 300 implements machine learning such that performance characteristics are dynamically stored and updated for the rated outputs. These embodiments may be particularly advantageous when testing is infrequent.

In some embodiments, surrogate foam test system 300 is communicable with a display. In these embodiments, surrogate foam test system 300 may, for a target rated output, display the flow rate of fluid, $F_4$ii, for the target rated output prior to entering foam distribution system 332. Surrogate foam test system 300 may additionally display the foam percentage, $F_{5ii}$, for the target rated output. In some applications, surrogate foam test system 300 may additionally display the date.

It should be understood, that although the present disclosure refers to V-port valve 320, embodiments of surrogate foam test system 300 are envisioned that use other fluid proportioning devices (e.g., metering valves, regulators, orifice, etc.) that are capable of controlling or otherwise regulating the flow of fluid within a foam distribution system of a fire fighting vehicle. Also, although the present application discusses the use of water from water tank 302, it is envisioned that other testing liquids may be stored in water tank 302 and used during a testing configuration.

Operational Configuration of Surrogate Foam Test System

Surrogate foam test system 300 may be set to an operational configuration/mode that is typically enabled when the ARFF vehicle is fighting fires. During an operational configuration of surrogate foam test system 300, flush valve 306 is in a closed position, blocking the flow of water from water tank 302 into flush line 314. Foam metering shut off valve 308 is in an open position, allowing the flow of foam concentrate from foam tank 304 into foam line 316 and through junction 318. Foam concentrate continues to flow through foam line 316, through electromagnetic flow meter 312 and into V-port valve 320. The foam continues through a check valve into foam eductor 324. Foam eductor 324 mixes the foam concentrate and water from water tank 302 (provided via water line 328) to form a foam mixture of a target consistency. In an exemplary embodiment, the foam concentrate and water mix to form a ratio of approximately three percent foam to water. In another exemplary embodiment, the foam concentrate and water mix to form a ratio of approximately six percent foam to water. In another exemplary embodiment, the foam concentrate and water mix to form a ratio of approximately one percent foam to water. In another exemplary embodiment, the foam concentrate and water mix to form a ratio of approximately eight percent foam to water.

Foam eductor 324 is generally a pump that utilizes a converging-diverging nozzle to convert the pressure energy of the water (i.e., the motive fluid) to velocity energy. This creates a low pressure zone that draws in the foam concentrate (e.g., via the Venturi effect). The foam mixture is discharged by foam eductor 324 through a pump inlet line 334 into the inlet side of pump 326. Pump 326 pressurizes and pumps the foam mixture and discharges the mixture into electromagnetic flow meter 330 and throughout the remainder of foam distribution system 332 to be dispensed (e.g., by a roof turret, a bumper turret, or a hose, etc.). Pump 326 may be any water/fluid pump capable of pumping a fluid at a particular pressure and rate.

Figure 4A:
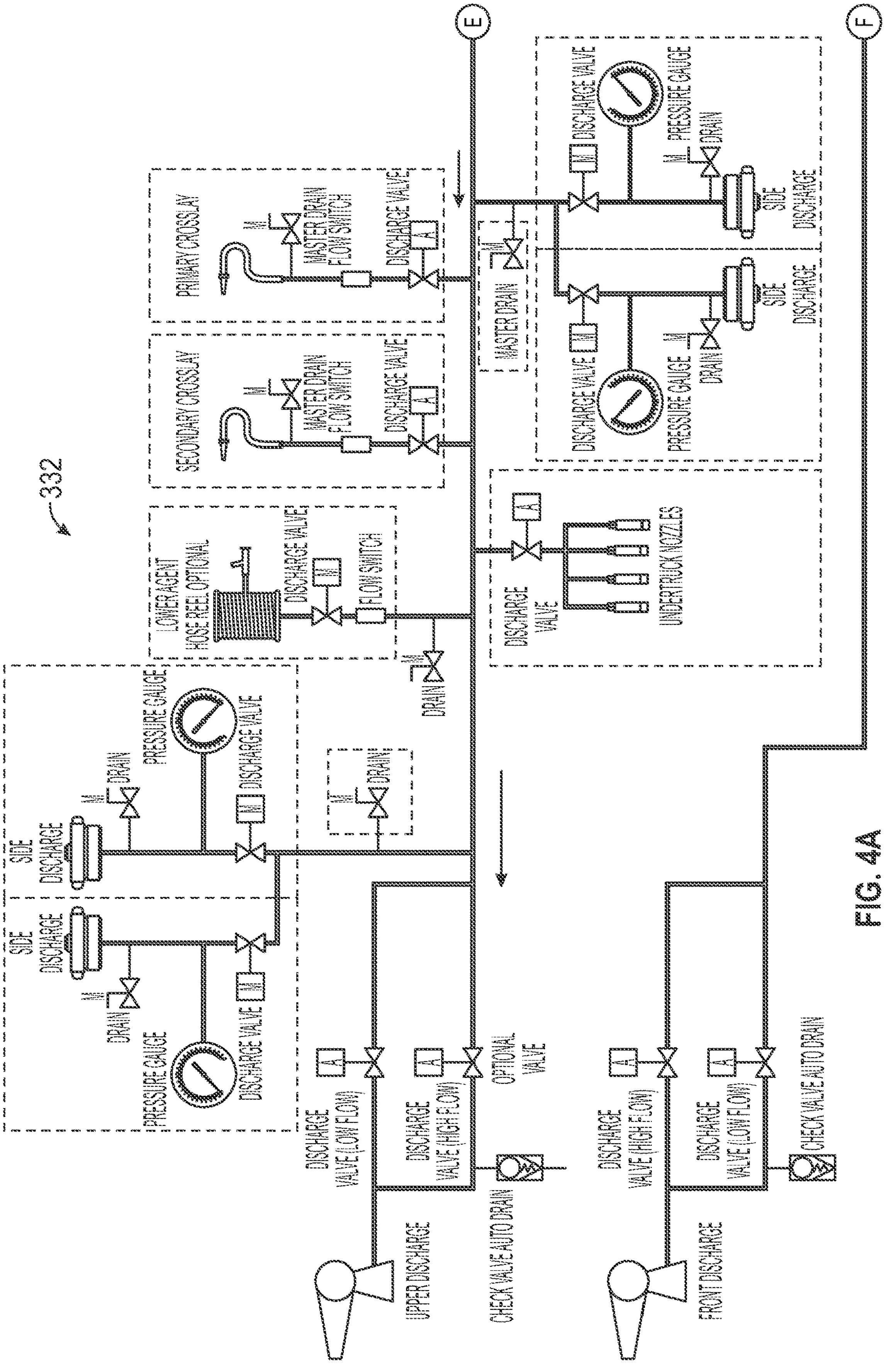
FIGS. 4A and 4B are a schematic piping diagram of a fluid distribution system for a fire fighting vehicle and for use with a surrogate foam test system, such as the surrogate foam test system shown in FIGS. 3A and 3B, according to an exemplary embodiment.
Figure 4B:
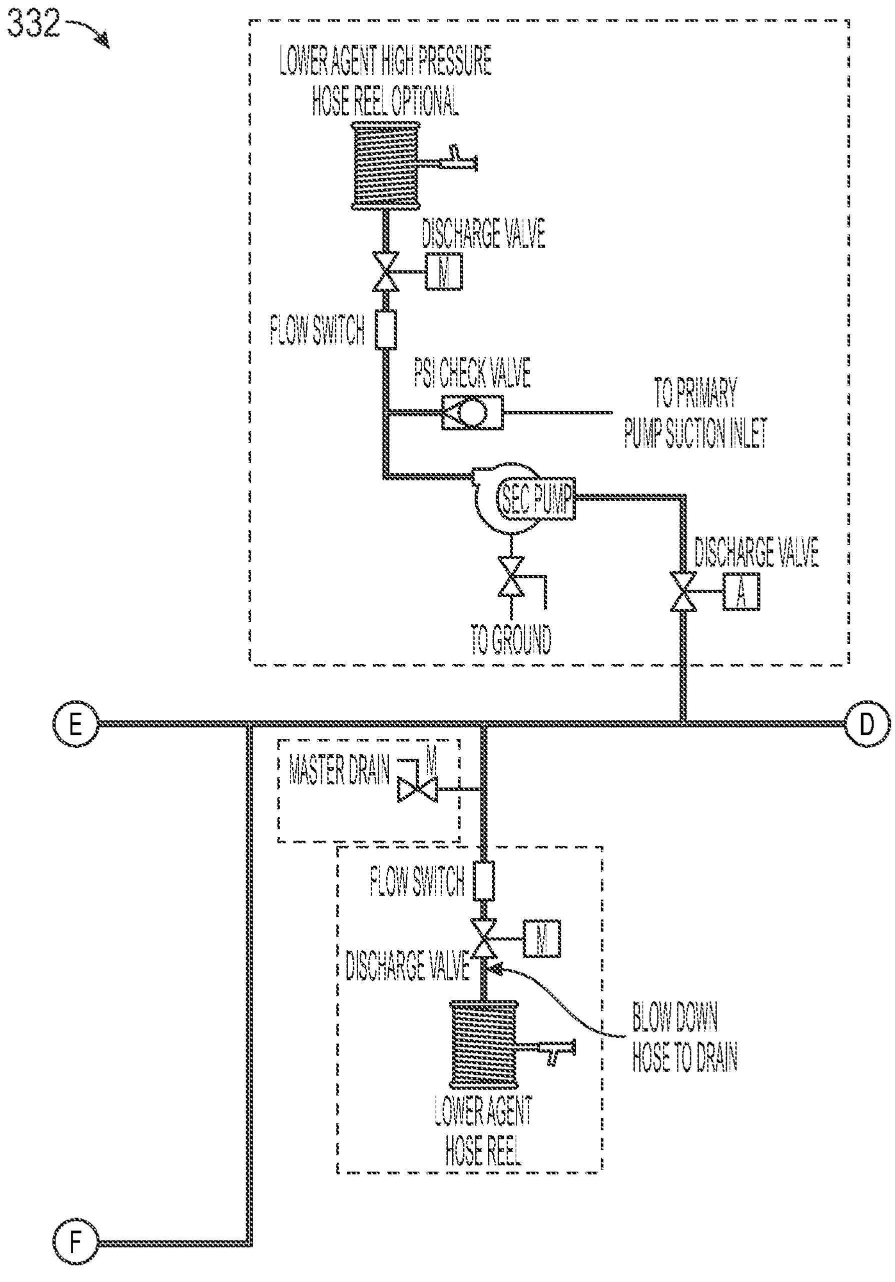

FIGS. 4A and 4B illustrate foam distribution system 332 according to an exemplary embodiment. As shown, foam distribution system 332 may include various discharges (e.g., side discharges, unregulated discharges, etc.), gauges (e.g., pressure gauges, etc.), valves (e.g., discharge valves, check valves, etc.), drains, hoses (e.g., reels, crosslays, etc.), switches (e.g., flow switches, etc.), pumps, nozzles (e.g., undertruck nozzles, etc.), and other similar components. Foam distribution system 332 as shown in FIGS. 4A and 4B is for illustrative purposes only and it is understood that foam distribution system 332 may include additional, fewer, and/or different components than those shown in FIGS. 4A and 4B.

Figure 5:
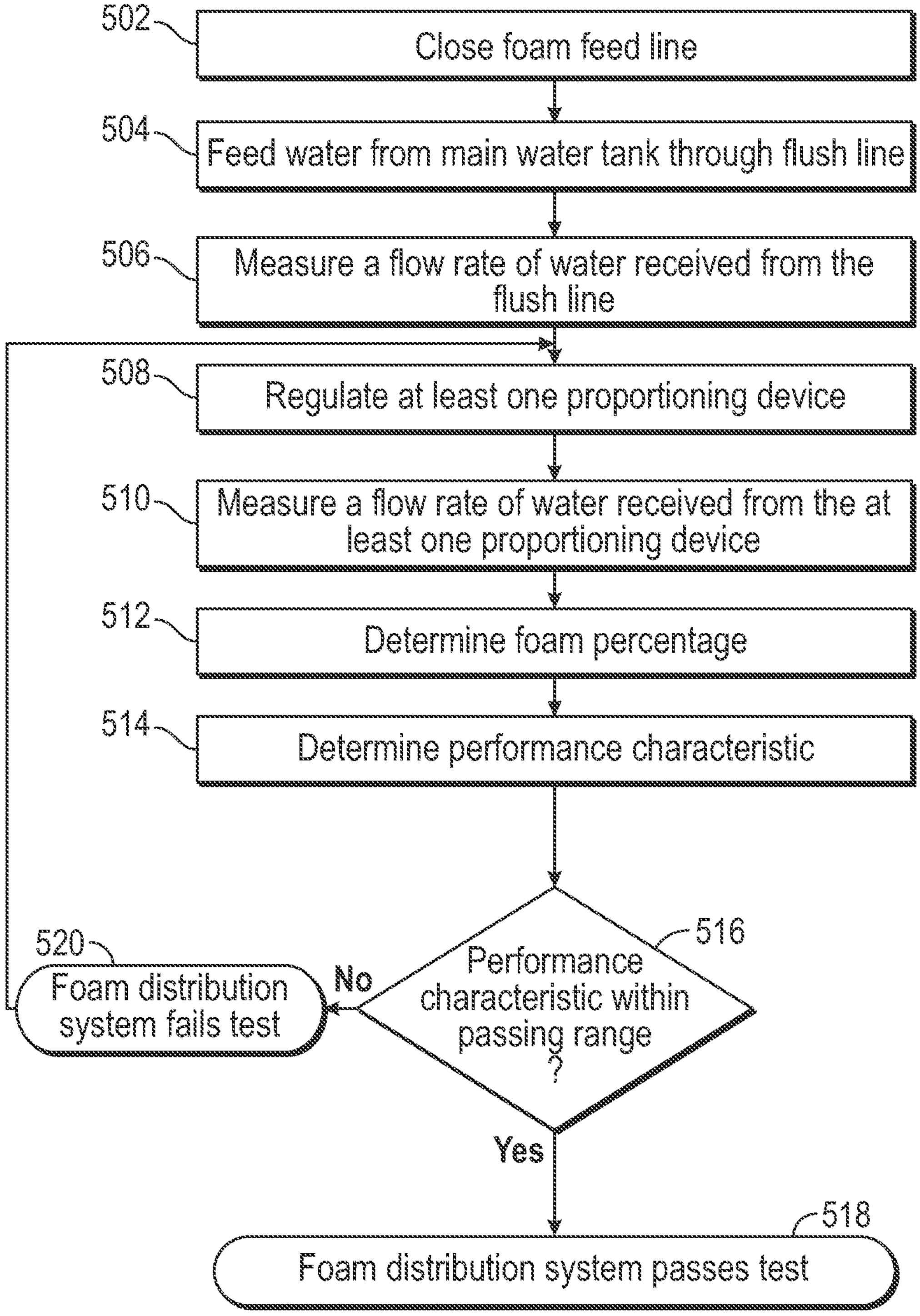
FIG. 5 is a flowchart of a process for testing a foam distribution system, according to an exemplary embodiment.

Referring to FIG. 5, a flow diagram of a process 500 for automatically testing a foam distribution system of a fire fighting vehicle (e.g., an ARFF vehicle, ARFF vehicle 100, etc.), is shown, according to an exemplary embodiment. In alternative embodiments, fewer, additional, and/or different steps may be performed. Also, the use of a flow diagram is not meant to be limiting with respect to the order of steps performed. Process 500 includes closing a foam feed line (step 502). The foam feed line may be closed by closing a foam valve (e.g., foam valve 208, foam metering shut off valve 308, etc.) that is attached to a foam tank (e.g., foam tank 104, foam tank 204, foam tank 304, etc.). The foam valve may be closed automatically via a control system (e.g., controller 210, etc.), or manually, and causes the flow of foam from the foam tank to cease entering the system.

Process 500 further includes feeding water from a main water tank (e.g., water tank 102, water tank 202, water tank 302, etc.) of the fire fighting vehicle through a flush line (e.g., flush line 314, etc.) (step 504). This may include opening a flush valve (e.g., flush valve 206, flush valve 306, etc.) to allow the water to flow into the flush line. The flush valve may be opened automatically via a control system, or may be opened manually. Process 500 further includes measuring a flow rate of the water received from the flush line through the use of a first flow meter (e.g., electromagnetic flow meter, flow meter 212, electromagnetic flow meter 312, etc.) of the system (step 506).

Process 500 further includes regulating the flow rate through at least one proportioning device (e.g., ball valve, V-port valve, metering valve, V-port valve 320, foam eductor 324, etc.) of the system (step 508). In an exemplary embodiment, the proportioning devices include a ball valve and V-port valve. The flow rate may be adjusted by rotating a rotatable ball member as described above. Process 500 further includes measuring a flow rate of the water received from the at least one proportioning device through the use of a second flow meter (e.g., electromagnetic flow meter, flow meter 214, electromagnetic flow meter 330, etc.) of the system (step 510). In some applications, a flow indicator may be used to monitor and visualize the flow rate of the water prior to entering the at least one proportioning device or prior to entering a foam distribution system (e.g., discharge system 220, foam distribution system 332, etc.). Both of the first flow meter and the second flow meter may be individually connected to a computing device (e.g., a controller, controller 210, etc.) capable of logging flow rates and/or foam percentages (e.g., including a time stamp). Historical data may be stored (e.g., on board the vehicle, etc.) in memory with the computing device. Also, the computing device may maintain statistics and perform analysis related to the water flow rate through the flush line and related to the water flow rate prior to entering the flow distribution system.

Process 500 further includes comparing measured flow rates of the water through the flush line (i.e., using the flow rate obtained in step 506) to measured flow rates of the water prior to entering the foam distribution system (i.e., using the flow rate obtained in step 510) to determine a foam percentage (step 512). Process 500 further includes comparing the foam percentage to a target foam percentage to determine a performance characteristic (step 514). Process 500 also includes comparing the performance characteristic to a passing range, where a performance characteristic within the passing range indicates the foam distribution system has passed the test run, and is acceptably functioning (i.e., for a target rated output) (step 516).

Thus, if the performance characteristic is within the passing range (step 518), then the foam distribution system is deemed to pass the test (i.e., for the target rated output), and is ready for use or further tests (e.g., for other rated outputs, etc.). If the performance characteristic is outside the passing range (step 520), then the foam distribution system is deemed to fail the test (i.e., for the target rated output), and the foam distribution system may be further tested or repaired, etc. Such further testing may include adjusting flow rates within the foam distribution system (e.g., at the at least one proportioning device, etc.), and repeating testing steps described herein. Alternatively, the at least one proportioning device may be adjusted based on the performance characteristic and the test, or steps thereof, may be repeated. For example, the at least one proportioning device may be adjusted to allow a greater flow rate through the at least one proportioning device, based on the performance characteristic.

Figure 6:
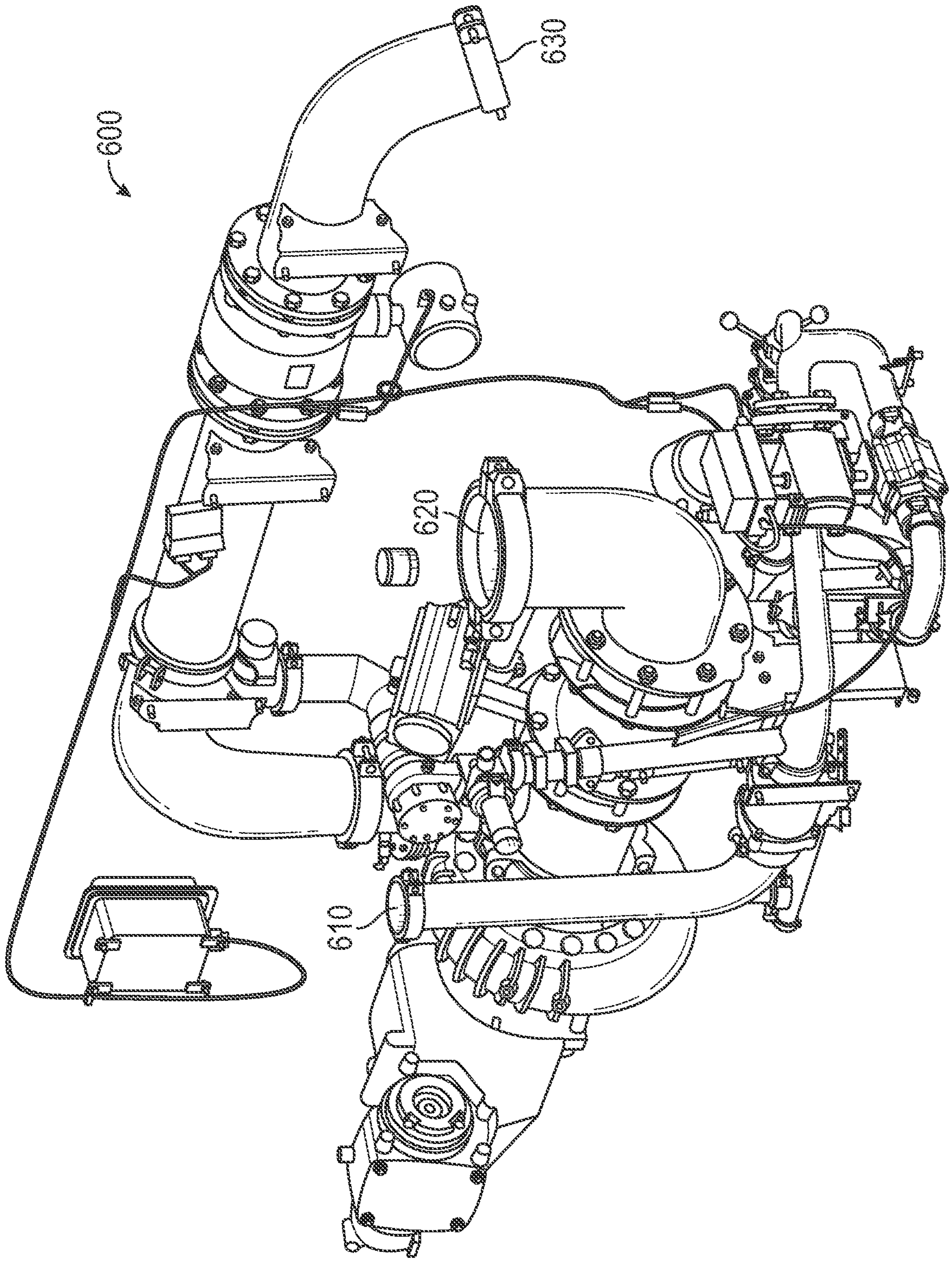
FIG. 6 is a perspective view of a foam mixing system, according to an exemplary embodiment.

FIG. 6 illustrates a system (e.g., machine, assembly, etc.), shown as foam mixing system 600. As shown in FIG. 6, foam mixing system 600 includes a first inlet (e.g., input, etc.), shown as foam inlet 610; a second inlet (e.g., input, etc.), shown as water inlet 620; and an outlet (e.g., output, etc.), shown as solution outlet 630. According to various embodiments, foam inlet 610 receives foam concentrate from a foam tank (e.g., foam tank 104, foam tank 204, foam tank 304, etc.), water inlet 620 receives water from a water tank (e.g., water tank 102, water tank 202, water tank 302, etc.), and foam mixing system 600 mixes the foam concentrate and the water to obtain a solution. Foam mixing system 600 then provides the solution through solution outlet 630 to a foam distribution system (e.g., discharge system 220, foam distribution system 332, etc.) as described above. Foam mixing system 600 may be implemented in surrogate foam test system 300 as described above.

As utilized herein, the terms "approximately," "about," "substantially," and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the terms "exemplary" and "example" as used herein to describe various embodiments is intended to indicate that such embodiments are possible examples, representations, and/or illustrations of possible embodiments (and such term is not intended to connote that such embodiments are necessarily extraordinary or superlative examples).

For purposes of this disclosure, the term "coupled" means the joining of two members directly or indirectly to one another. Such joining may be stationary in nature (e.g., permanent, etc.) or moveable in nature (e.g., removable, releasable, etc.). Such joining may allow for the flow of electricity, electrical signals, or other types of signals or communication between the two members. Such joining may be achieved with the two members or the two members and any additional intermediate members being integrally formed as a single unitary body with one another or with the two members or the two members and any additional intermediate members being attached to one another. Such joining may be permanent in nature or alternatively may be removable or releasable in nature.

References herein to the positions of elements (e.g., "top," "bottom," "above," "below," "between," etc.) are merely used to describe the orientation of various elements in the figures. It should be noted that the orientation of various elements may differ according to other exemplary embodiments, and that such variations are intended to be encompassed by the present disclosure.

Also, the term "or" is used in its inclusive sense (and not in its exclusive sense) so that when used, for example, to connect a list of elements, the term "or" means one, some, or all of the elements in the list. Conjunctive language such as the phrase "at least one of X, Y, and Z," unless specifically stated otherwise, is otherwise understood with the context as used in general to convey that an item, term, etc. may be either X, Y, Z, X and Y, X and Z, Y and Z, or X, Y, and Z (i.e., any combination of X, Y, and Z). Thus, such conjunctive language is not generally intended to imply that certain embodiments require at least one of X, at least one of Y, and at least one of Z to each be present, unless otherwise indicated.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. For example, methods of monitoring and controlling the flow rate of fluid through the system may be implemented with a software application. Additionally, devices such as a pitot tube and manometer may be configured to monitor the flow rate of fluid through the systems described herein, and may be used in controlling the flow rate of fluid. Monitoring of the flow rate may also include calculations related to flow rate, viscosity, pressure, fluid density, volumes, temperature, etc. Other devices capable of receiving and monitoring flow rate data are also envisioned. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can comprise RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. When information is transferred or provided over a network or another communications connection (either hardwired, wireless, or a combination of hardwired or wireless) to a machine, the machine properly views the connection as a machine-readable medium. Thus, any such connection is properly termed a machine-readable medium. Combinations of the above are also included within the scope of machine-readable media. Machine-executable instructions include, for example, instructions and data which cause a general purpose computer, special purpose computer, or special purpose processing machines to perform a certain function or group of functions.

The construction and arrangements of the systems and methods, as shown in the various exemplary embodiments, are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Some elements shown as integrally formed may be constructed of multiple parts or elements. The position of elements may be reversed or otherwise varied. The nature or number of discrete elements or positions may be altered or varied. Although the figures may show a specific order of method steps, the order of the steps may differ from what is depicted. Also two or more steps may be performed concurrently or with partial concurrence. The order or sequence of any process, logical algorithm, or method steps may be varied or re-sequenced according to alternative embodiments. Other substitutions, modifications, changes and omissions may also be made in the design, operating conditions and arrangement of the various exemplary embodiments without departing from the scope of the present invention. All such variations are within the scope of the disclosure. Likewise, software implementations could be accomplished with standard programming techniques with rule based logic and other logic to accomplish the various connection steps, processing steps, comparison steps and decision steps. It should be noted that the elements and/or assemblies of the components described herein may be constructed from any of a wide variety of materials that provide sufficient strength or durability, in any of a wide variety of colors, textures, and combinations. Accordingly, all such modifications are intended to be included within the scope of the present inventions. Other substitutions, modifications, changes, and omissions may be made in the design, operating conditions, and arrangement of the preferred and other exemplary embodiments without departing from scope of the present disclosure or from the spirit of the appended claim.

The invention claimed is:

1. A fluid distribution system for a fire apparatus that is selectively operable in a testing mode and an operating mode, the fluid distribution system comprising:
- a first flow meter configured to be positioned along an agent line;
- a metering valve configured to be positioned downstream of the first flow meter;
- a second flow meter configured to be positioned downstream of the first flow meter and an eductor; and
- a controller configured to selectively operate the fluid distribution system in the testing mode, wherein, during the testing mode, the controller is configured to:
  - conduct a testing mode sequence including acquiring a first flow rate of a fluid flowing through the first flow meter and a second flow rate of the fluid flowing through the second flow meter and determining a performance characteristic based on the first flow rate and the second flow rate; and
  - modulate a current setting of the metering valve from a first setting to a second setting and conduct the testing mode sequence again at the second setting of the metering valve to verify the fluid distribution system is performing properly.

2. The fluid distribution system of claim 1, wherein the controller is configured to:
- determine a flow percentage by dividing the first flow rate by the second flow rate;
- compare the flow percentage to a target flow percentage to determine the performance characteristic; and
- determine the fluid distribution system is performing properly based on the performance characteristic being in a predetermined range.

3. The fluid distribution system of claim 2, wherein the predetermined range is based on the current setting of the metering valve.

4. The fluid distribution system of claim 1, further comprising:
- an agent valve configured to be positioned along the agent line; and
- a flush valve configured to be positioned along a flush line.

5. The fluid distribution system of claim 4, wherein, during the testing mode, the controller is configured to:
- close the agent valve to prevent an agent from flowing through the agent valve along the agent line to the first flow meter, the metering valve, and the second flow meter; and
- open the flush valve such that a water source is in fluid communication with the first flow meter, the metering valve, and the second flow meter.

6. The fluid distribution system of claim 4, wherein the controller is configured to selectively operate the fluid distribution system in the operating mode.

7. The fluid distribution system of claim 6, wherein, during the operating mode, the controller is configured to:
close the flush valve to prevent water from a water source from flowing through the flush valve; and
open the agent valve such that an agent source is in fluid communication with the first flow meter, the metering valve, and the second flow meter.

8. The fluid distribution system of claim 7, wherein, during the operating mode, the controller is configured to modulate the metering valve to provide a target amount of agent to the eductor to mix with the water from the water source provided via a water line to provide a fluid mixture having a target agent-to-water ratio.

9. An apparatus for a fluid distribution system of a fire apparatus that includes a water line configured to receive water from a water source, an agent line configured to receive agent from an agent source, a flush line configured to receive the water from the water source and connecting to the agent line at a junction, a flush valve positioned to selectively prevent the water from flowing along the flush line downstream of the flush valve, an agent valve positioned to selectively prevent the agent from flowing along the agent line downstream of the agent valve, a first flow meter positioned along the agent line downstream of the junction, a second flow meter positioned downstream of the first flow meter, an eductor coupled to the agent line and the water line downstream of the first flow meter and upstream of the second flow meter, and a metering valve positioned downstream of the first flow meter and upstream of the eductor, the apparatus comprising:
a controller configured to selectively operate the fluid distribution system in a testing mode, wherein, during the testing mode, the controller is configured to:
close the agent valve;
open the flush valve;
perform a testing sequence that includes (a) acquiring a first flow rate of the water flowing through the first flow meter, (b) acquiring a second flow rate of the water flowing through the second flow meter, and (c) determining a performance characteristic based on the first flow rate and the second flow rate;
modulate a current setting of the metering valve from a first setting to a second setting; and
conduct the testing sequence again at the second setting of the metering valve to verify the fluid distribution system is performing properly.

10. The apparatus of claim 9, wherein the controller is configured to:
determine a flow percentage by dividing the first flow rate by the second flow rate;
compare the flow percentage to a target flow percentage to determine the performance characteristic; and
determine the fluid distribution system is performing properly based on the performance characteristic being in a predetermined range.

11. The apparatus of claim 10, wherein the predetermined range is based on the current setting of the metering valve.

12. The apparatus of claim 9, wherein, during the testing mode, the controller is configured to:
close the agent valve to prevent the agent from the agent source from flowing through the agent valve along the agent line to the first flow meter, the metering valve, the eductor, and the second flow meter; and
open the flush valve such that the water source is in fluid communication with the first flow meter, the metering valve, the eductor, and the second flow meter.

13. The apparatus of claim 9, wherein the controller is configured to selectively operate the fluid distribution system in an operating mode.

14. The apparatus of claim 13, wherein, during the operating mode, the controller is configured to:
close the flush valve to prevent the water from the water source from flowing through the flush valve to the agent line; and
open the agent valve such that the agent source is in fluid communication with the first flow meter, the metering valve, the eductor, and the second flow meter.

15. The apparatus of claim 14, wherein, during the operating mode, the controller is configured to modulate the metering valve to provide a target amount of the agent to the eductor to mix with the water from the water source provided via the water line to provide a fluid mixture having a target agent-to-water ratio.

16. A fluid distribution system for a fire apparatus, the fluid distribution system comprising:
a water line configured to receive water from a water source;
an agent line configured to receive agent from an agent source;
a flush line configured to receive the water from the water source, the flush line connecting to the agent line at a junction, the flush line separate from the water line;
a flush valve positioned along the flush line and upstream of the junction to selectively prevent the water from flowing into the agent line;
an agent valve positioned along the agent line and upstream of the junction to selectively prevent the agent from flowing along the agent line downstream of the agent valve;
a first flow meter positioned along the agent line downstream of the junction;
a second flow meter positioned downstream of the first flow meter;
an eductor coupled to the agent line and the water line downstream of the first flow meter and upstream of the second flow meter;
a metering valve positioned downstream of the first flow meter and upstream of the eductor; and
a controller configured to selectively operate the fluid distribution system in a testing mode, wherein during the testing mode, the controller is configured to:
close the agent valve;
open the flush valve;
perform a testing sequence that includes (a) acquiring a first flow rate of the water flowing through the first flow meter, (b) acquiring a second flow rate of the water flowing through the second flow meter, and (c) determining a performance characteristic based on the first flow rate and the second flow rate;
modulate a current setting of the metering valve from a first setting to a second setting; and
conduct the testing sequence again at the second setting of the metering valve to verify the fluid distribution system is performing properly.

17. The fluid distribution system of claim 16, further comprising a water tank, wherein the water tank is the water source.

18. The fluid distribution system of claim 16, further comprising an agent tank, wherein the agent tank is the agent source.

19. The fluid distribution system of claim 16, further comprising a pump positioned downstream of the eductor and upstream of the second flow meter.

* * * * *